United States Patent [19]

Sturm

[11] Patent Number: 5,714,693
[45] Date of Patent: Feb. 3, 1998

[54] DYNAMIC SENSOR

[75] Inventor: Christian Sturm, Krefeld, Germany

[73] Assignee: W. Schlafhorst AG & Co., Moenchengladbach, Germany

[21] Appl. No.: 702,788

[22] Filed: Aug. 23, 1996

[30] Foreign Application Priority Data

Aug. 26, 1996 [DE] Germany ............... 195 31 448.4

[51] Int. Cl.$^6$ ........................................ G01L 2/08
[52] U.S. Cl. .................... 73/862.454; 73/862.471; 73/715
[58] Field of Search ............ 73/862.391, 862.42, 73/862.451, 862.453, 862.454, 862.471, 862.472, 862.473, 826, 828, 159, 715, 728

[56] References Cited

U.S. PATENT DOCUMENTS

| | | | |
|---|---|---|---|
| 1,780,141 | 10/1930 | Goldman | 73/862.454 |
| 1,872,087 | 8/1932 | Martin | 73/862.454 |
| 2,099,955 | 11/1937 | Edwards | 73/862.454 |
| 2,528,883 | 11/1950 | Hayward | 73/862.454 X |
| 2,914,949 | 12/1959 | Hastings | 73/715 |
| 3,149,489 | 9/1964 | Schmaeng | 73/862.454 |
| 4,333,350 | 6/1982 | Gibb | 73/715 |
| 4,711,133 | 12/1987 | Berglund | 73/862.454 X |
| 4,992,778 | 2/1991 | McKeen et al. | 73/862.451 X |
| 5,133,217 | 7/1992 | Jordan | 73/862.471 X |
| 5,329,822 | 7/1994 | Hartel et al. | |

FOREIGN PATENT DOCUMENTS

| | | |
|---|---|---|
| 0 531 753 B1 | 8/1992 | European Pat. Off. |
| 0 574 062 A1 | 12/1993 | European Pat. Off. |
| 89 00 167 U1 | 6/1990 | Germany |
| 41 29 803 A1 | 3/1992 | Germany |

OTHER PUBLICATIONS

Christof Rohrbach, "Handbuch für elektrisches Messen mechanischer Gröss en", 1967, pp. 199–201.

Primary Examiner—Elizabeth L. Dougherty
Attorney, Agent, or Firm—Kennedy Covington Lobdell & Hickman LLP

[57] ABSTRACT

There are dynamic sensors whose plunger is seated in the center of at least one diaphragm. In certain instances of use it is not possible to protect the sensitive diaphragms against inappropriate handling. For example, dynamic sensors are employed in the textile industry as yarn tensile force sensors. The diaphragm in which the yarn feeler is seated, which faces the yarn travel path, cannot be protected by means of a cover against unintentional touching, since dust accumulations between the cover and the diaphragm can hamper its function. For protecting the diaphragm it is therefore proposed in accordance with the invention that a support body is disposed a short distance behind the diaphragm and that the side of the support body facing the diaphragm has a support contour which is essentially matched to the contour on the side of the diaphragm facing the support body.

14 Claims, 3 Drawing Sheets

DYNAMIC SENSOR

FIELD OF THE INVENTION

The invention relates to a dynamic sensor having a plunger which is attached to at least one diaphragm.

BACKGROUND OF THE INVENTION

Dynamic sensors are employed as yarn tensile force sensors, for example. Such a device for determining the yarn tensile force of yarn which is wound on bobbins of textile machines is known from European patent publication EP 0 531 753B 1. Electro-dynamic plunger sensors are particularly suited for measuring the yarn tensile force of rapidly moving yarn, since it is possible to also determine high-frequency fluctuations in the yarn tensile force by their means.

In order to be able to transmit high-frequency fluctuations of the pressure on the measuring sensor and thus on the plunger with as little inertia as possible, the plunger is seated by means of at least one diaphragm. An example for plunger seating by means of a diaphragm is known from an exemplary embodiment of the above mentioned EP 0 531 753B 1. As a rule, the diaphragms are disk-shaped. They can be provided with concentrically arranged beads or other contours for the generation of a linear force-distance characteristic line. As a rule the plunger is centered on a shaft which in turn is guided through the center of the diaphragm and is fixedly connected with it.

Because of the low mass and the small size of the plunger sensors in connection with the forces such as occur with, for example, yarn being wound, the diaphragms are very thin, for example, less than a tenth of a millimeter, and are therefore sensitive and vulnerable to damage from inappropriate handling. If, for example, one of the beads of a diaphragm with concentrically arranged beads is locally depressed from the direction of its raised side, the elasticity of the diaphragm is as a rule insufficient for correcting this error. The deformation remains and therefore hampers the diaphragm's ability to vibrate as intended, thus interfering with its ability to function in the plunger sensor.

To cover the diaphragms for their protection is not always possible. Particularly in textile machines the covering of a diaphragm which has a feeler on the running yarn is not possible, since dust collections would form between the diaphragm and the cover because of flying fibers, which hampers the function of the diaphragm.

SUMMARY OF THE INVENTION

It is the object of the instant invention to maintain the functionality of diaphragms on which the plungers of dynamic sensors are seated.

This object is attained in accordance with the invention with the aid of the characterizing features of the first claim. Further advantages of the invention are claimed in its dependent claims.

The dynamic sensor of the present invention includes a housing which defines a plunger chamber about a plunger axis and has a plunger support surface adjacent the chamber, plunger means disposed in the chamber for a predetermined range of sensing movement along the plunger axis in response to a component of a force, and a diaphragm attached to the support surface and to the plunger means so that it deflects over a predetermined range in response to sensing movement of the plunger means, with the support surface having a support contour which substantially conforms to a configuration assumed by the diaphragm at its maximum deflection in response to the sensing movement of the plunger means.

The diaphragm and support contour are positioned with respect to each other so that they will be out of contact at the maximum deflection of the diaphragm in response to sensing movement of the plunger means. The diaphragm and support contour may also be positioned so that they are spaced from each other a substantially constant distance at the maximum deflection of the diaphragm in response to sensing movement of the plunger means, and the constant distance is preferably at least 0.1 millimeters.

The diaphragm of the present invention preferably includes raised concentric portions, and the diaphragm may have a center, with the plunger means attached to the diaphragm at its center. The housing may include a support body on which the support surface is formed. The force in response to which the plunger means has sensing movement may be yarn tensile force.

In an advantageous embodiment of the invention the support body can be produced as an injection-molded part, and in another advantageous embodiment the support body can be produced as a pressure die-cast part. Injection-molded bodies made of plastic and pressure die-cast bodies made of metal can be inexpensively produced in large numbers, yet in both instances exact dimensions can be maintained throughout production of the support bodies. The required contour for the support body need only be formed once on the shaping tool or mold used in production of the support bodies.

In a further advantageous embodiment of the invention, the support body and the diaphragm can be combined into a structural unit for installation in the dynamic sensor. The structural unit made up by the support body and the diaphragm can be prefabricated, with the support body therefore already in place to protect the diaphragm from damage during assembly of the dynamic sensor.

By forming the support contour to conform to the contour of the diaphragm in its maximum deflection in response to sensing movement of the plunger means, it is provided that, in case of a deformation of the diaphragm which exceeds the diaphragm's range of sensing-related deformation, the contour of the diaphragm will be completely supported on the support contour, without permanent damage. Diaphragms of the type having concentric raised portions are particularly susceptible to damage, such as dents, from such deformations, and dents of this type can considerably hamper or even interrupt functioning of the diaphragm. The support and protection provided by the present invention is therefore of particular benefit in preventing such damage.

DESCRIPTION OF THE PREFERRED EMBODIMENT

Figure 1:
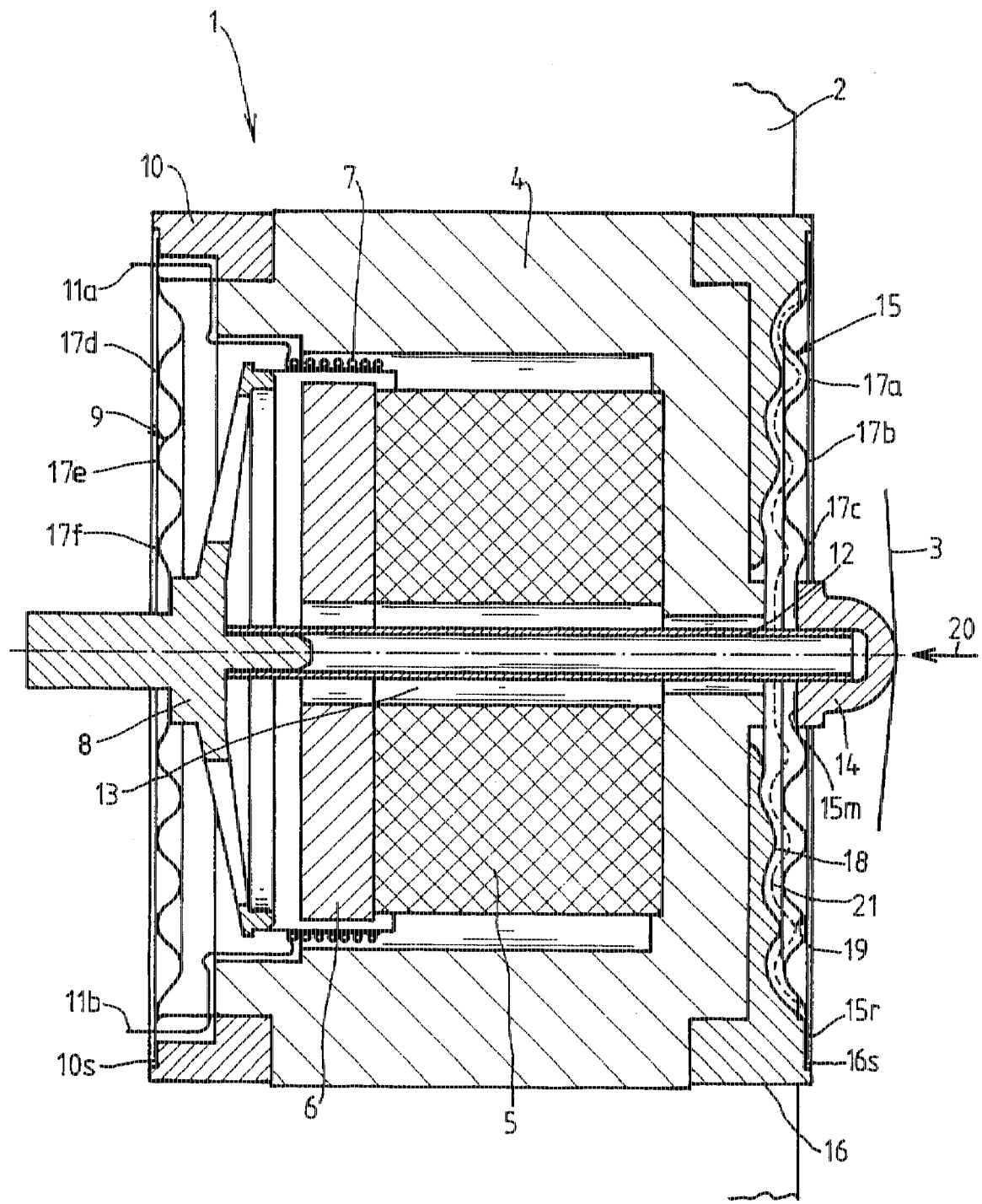
FIG. 1 is a sectional schematic view of a dynamic sensor used as a yarn tensile force sensor in a textile machine.

FIG. 1 shows in sectional view a dynamic sensor in the preferred form of an electro-dynamic plunger sensor which is employed as a yarn tensile force sensor in a textile machine. Only the features aiding in understanding the invention have been represented and will be explained.

The yarn tensile force sensor 1 is installed in a housing 4 in a textile machine, not represented here, whose contour 2 is indicated here. The housing 4 encloses the yarn tensile force sensor with the exception of the open front end which faces the object to be measured, in this case a running yarn 3. The diaphragm is not covered because dust and flying fibers could form between the cover and the diaphragm, which would hamper the function of the diaphragm.

The cup-shaped housing 4 is a component of the magnetic system of the electro-dynamic sensor, which is conventional. A permanent magnet 5 which supports a pole disk 6 is arranged centered in the interior of the housing 4. The pole disk 6 is annularly enclosed by the plunger 7. The plunger 7 is supported by a plunger support 8, one end of which is seated centered in a diaphragm 9 which, glued to a ring 10, closes the housing 4 on the side facing away from the yarn 3. The electrical connections of the plunger 7 are identified by 11a and 11b. The connections of the plunger lead to a control device, not shown here. Such a control device is known from EP 0 531 753B 1, for example.

The plunger support 8 has a small tube 12, which is guided through the centered bore of the pole disk and the permanent magnet as well as the housing 4 and projects out of the housing 4. On its end it supports the feeler 14 over which the yarn 3 runs. The feeler 14 is connected with a circle-shaped diaphragm 15 in such a way that it is disposed centered in the diaphragm center 15m. With its exterior circumferential rim 15r the diaphragm 15 is glued on the ring-shaped front face 16s of the support body 16.

The shape of the diaphragms 9 and 15 is identical. Each one of the two diaphragms 9 and 15 has three beads 17a, 17b and 17c, as well as 17d, 17e and 17f. They are of the same height and form concentric rings. The diaphragms have been arranged in such a way that the respective beads point outward.

On its side facing the diaphragm 15, the support body 16 has a support contour 18 which essentially follows the course of the contour 19 of the side of the diaphragm facing the support body 16. Ring-shaped face 16s and support contour 18 together make up the support surface of support body 18. It is the job of the support contour 18 of the support body 16 to support the diaphragm 15, particularly in case of unintentional point-like loads on the beads. Denting of the beads is prevented by means of this. A point-like load on the beads in particular can lead to kinks in certain materials, for example poly-carbonates, which destroy the structure of the diaphragm surface and in this way make it unusable. The support body furthermore prevents plastic deformations over large areas and deformations going beyond the deformations in accordance with the dynamic sensor's function in the course of yarn tensile force testing. If there are dents which can be elastically reshaped, the diaphragm can nevertheless become unusable if it is dented from the direction of the accessible front side but is no longer accessible from the back for pushing the deformation out again.

The feeler 14 must be able to perform a back-and-forth movement so that the electro-dynamic plunger sensor can perform its function. Therefore the diaphragms must be able to oscillate freely in the range of the measuring values to be recorded.

In the instant exemplary embodiment, the yarn 3 presses against the feeler 14 in the direction of the arrow 20. FIG. 1 represents the position of the diaphragm 15 in its undeflected position. The sensing-related deflection of the diaphragm is drawn in FIG. 1 by the contour course 21 indicated by dashed lines. In this maximum sensing-related deflection, the diaphragm is not permitted to come to rest against the support contour 18 of the support body 16. The distance between the diaphragm 15 and the support contour 18 of the support body 16 advantageously should be at least 0.1 mm. In the instant exemplary embodiment, the distances between the diaphragm 15 and the support contour 18 of the support body 16 are shown enlarged beyond the actual distance conditions for the sake of clarification.

As can be seen in FIG. 1, the support contour 18 of the support body 16 is essentially matched to the contour 19 of the diaphragm 15 and makes allowance for the sensing-related maximum deflection 21 by the recession of the support contour 18 in the direction toward the center 15m of the diaphragm.

The support body 16 can be an injection-molded part, for example, made of plastic, or a pressure die-cast part made of metal, since it is possible to reproduce the complicated surface shape of the support contour 18 simply and inexpensively on injection-molded and pressure die-cast parts. If the diaphragm 15 is already glued to the rim of this injection-molded or pressure die-cast part before the electro-dynamic plunger sensor is mounted, the diaphragm 15 is already advantageously protected against damage during gluing the feeler 14 on and during the subsequent assembly.

Figure 3:
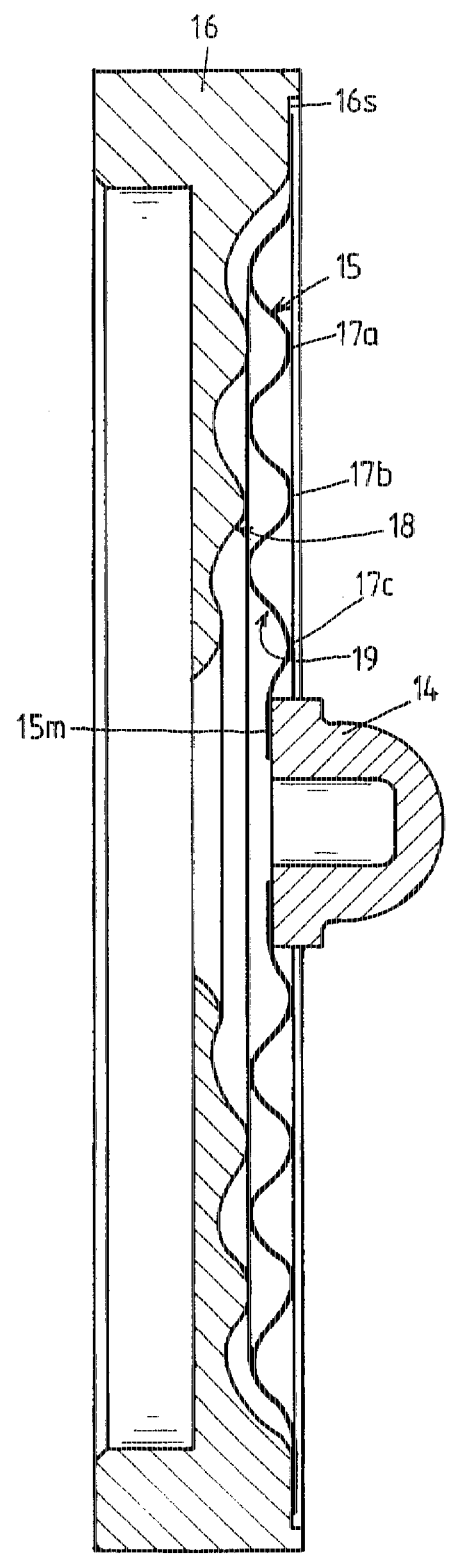
FIG. 3 is a sectional view of a support body and a diaphragm of the present invention.

The support body 16 and diaphragm 15 can be combined into a structural unit, which may be fabricated, with the diaphragm 15 being glued to ring-shaped face 16s of the support body 16 prior to installation of the combined structural unit into the dynamic sensor (see FIG. 3). Such prefabrication results in the support body 16 being in place to protect the diaphragm 15 against inappropriate handling during, for example, mounting of the feeler 14 on the diaphragm 15, installation of the feeler 14 on the tube 12, or other assembly. Damage to the sensitive diaphragm during assembly of the dynamic sensor can thereby advantageously be avoided.

Figure 2:
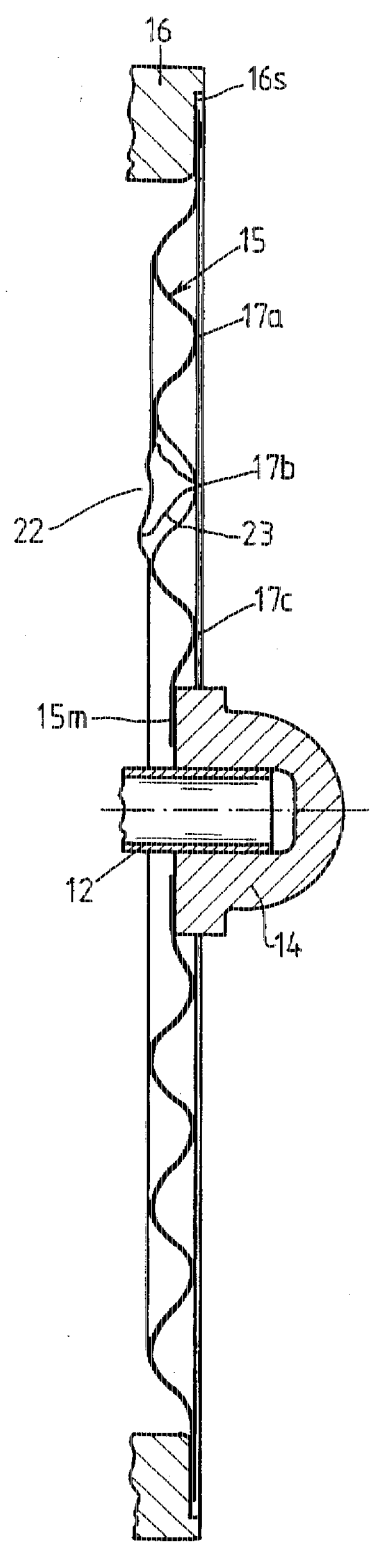
FIG. 2 is a sectional view of a damaged diaphragm with a dented bead.

FIG. 2 shows, in an enlargement of FIG. 1, a damaged diaphragm 15. It can be seen that the bead 17b has been locally dented, which has caused a deformed place 22. Such deformations can be caused, for example, by fingernails or screwdrivers and often lead to kinks when the bead is dented, which cause the destruction of the material. In such a case the diaphragm is unable to function. Since the diaphragm yields when an object hits it, if it does not already destroy the diaphragm because of its sharp contour when it hits, the support body in accordance with the invention provides a dependable protection against damage, since it catches and supports the yielding diaphragm. Further bending or local deformation, which finally results in a deformed place, is prevented in this way.

FIG. 3 shows as an enlarged detail of FIG. 1 the diaphragm 15 with the support body 16 combined in a ready-to-install structural unit. The feeler 14 has already been glued in the center 15m of the diaphragm 15.

Figure 4:
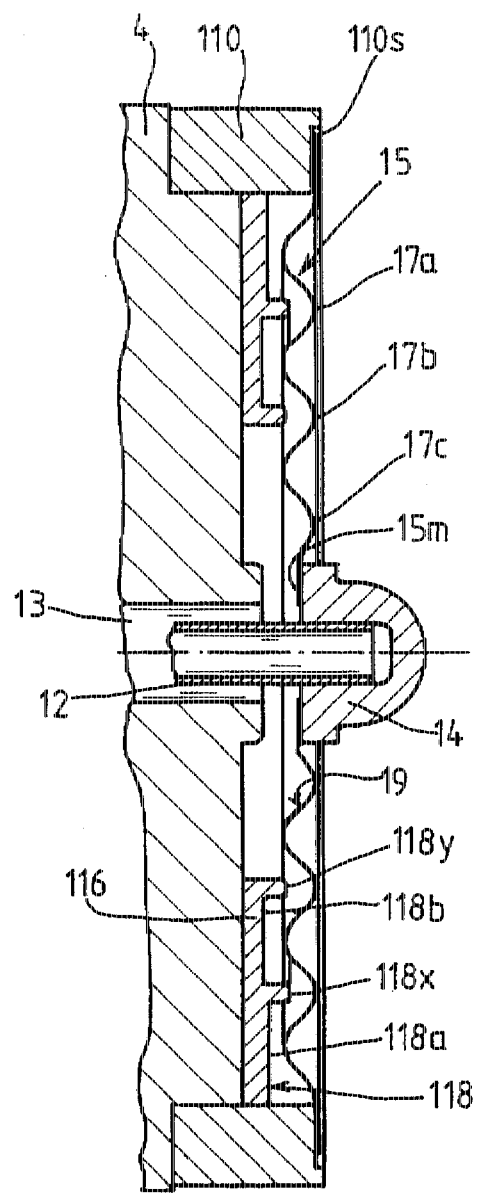
FIG. 4 is a sectional view of an additional embodiment of a support body of the present invention.

An ideal course of the support contour 18 of the support body 16 is shown in FIGS. 1 and 3. A disk of stepped thickness with two concentric stepped bars, which are respectively disposed behind the two outermost beads which are the most endangered, also performs the function of the protection of the beads. An exemplary embodiment thereof is represented in FIG. 4. In the exemplary embodiment of FIG. 4, all characteristics which have remained unchanged from the previous exemplary embodiment are identified by the same reference numerals. In the exemplary embodiment of FIG. 4, the diaphragm 15 is glued to the front face 110s of a ring 110, which is identical in size and shape with the ring 10 to which the diaphragm 9 is glued. A disk 116 is glued as the support body to the front face of the bottom of the cup-shaped housing 4. The circumference of the disk 116 is centered by the ring 110. On its support contour 188 facing the diaphragm 15, the disk has two zones 118a and 118b of different thickness, which makes allowance for the course of the contour of the diaphragm 15 during a sensing-related maximum deformation. Ring-shaped bars 118x and 118y, whose height is also stepped in view of the sensing-related maximum deflection, are used for supporting the beads 17a and 17b, which are the most endangered by damage and denting.

The advantage of the support body 16 in accordance with the previous exemplary embodiment over the support body 116 lies in that in the first case the diaphragm 15 can rest flat on the support body, while with the support body 116 the diaphragm is only supported in a ring shape in the raised and depressed areas of the bead. However, the support body 116 requires no complicated shape and is therefore simpler to produce, which is advantageous in particular when small numbers are produced.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A dynamic sensor, comprising
   a housing defining a plunger chamber about a plunger axis;
   plunger means disposed in said chamber for a predetermined range of sensing movement parallel to said axis in response to an axial component of a force to be measured by the sensor; and
   a flexible, thin-walled support attached to said plunger means and to said housing for said movable disposition of said plunger means, said thin-walled support having an exposed outward side and having an opposite side facing said chamber with both sides thereof being exposed to equivalent pressure during said sensing movement of said plunger means, said housing including a support surface having a support contour facing said opposite side of said thin-walled support which substantially conforms to a configuration assumed by said thin-walled support when deflected a maximum extent by said sensing movement of said plunger means.

2. The dynamic sensor of claim 1, wherein said thin-walled support and said support contour are relatively positioned to be out of contact with one another at said maximum deflection.

3. The dynamic sensor of claim 2, wherein said thin-walled support and said support contour are relatively positioned to be spaced from one another a substantially constant distance at said maximum deflection.

4. The dynamic sensor of claim 3, wherein said constant distance is at least 0.1 millimeters.

5. The dynamic sensor of claim 1, wherein said thin-walled support is disc-shaped and includes concentric raised portions.

6. The dynamic sensor of claim 1, wherein said force is a yarn tensile force.

7. The dynamic sensor of claim 1, wherein said thin-walled support has a center, and said diaphragm is attached to said plunger means at said center.

8. The dynamic sensor of claim 1, wherein said housing further includes a support body attached to said housing, said support surface being formed on said support body.

9. The dynamic sensor of claim 8, wherein said support body is formed by injection-molding.

10. The dynamic sensor of claim 8, wherein said support body is formed by pressure die-casting.

11. The dynamic sensor of claim 8, wherein said support body and said thin-walled support form a structural unit for installation in said dynamic sensor.

12. The dynamic sensor of claim 11, wherein said structural unit is prefabricated.

13. A dynamic sensor, comprising:
    a housing defining a chamber therein about an axis;
    plunger means disposed in said chamber for sensing movement parallel to said axis in response to an axial component of a force to be measured by the sensor; and
    first and second flexible, thin-walled supports attached to said plunger means and to said housing for said movable disposition of said plunger means, said first and said second thin-walled supports being exposed to equivalent pressure during said sensing movement of said plunger means and enclosing said chamber with said first thin-walled support having an exposed outward side and having an opposite side facing towards said chamber, said housing including a support surface having a support contour facing said opposite side of said first thin-walled support that substantially conforms to a configuration assumed by said first thin-walled support when deflected a maximum extent towards said chamber for continuous engagement and support therewith at said maximum deflection.

14. A dynamic sensor for measuring tensile force in yarn, comprising:
    a housing defining a chamber therein about an axis;
    plunger means disposed in said chamber for movement parallel to said axis including a predetermined range of sensing movement within said chamber in response to an axial component of a yarn tensile force to be measured by the sensor; and
    first and second flexible, thin-walled supports attached to said plunger means and to said housing for said movable disposition of said plunger means, said first and said second thin-walled supports being exposed to ambient pressure during said sensing movement of said plunger means and enclosing said chamber with said first thin-walled support having an exposed outward side adjacent the yarn and having an opposite side facing towards said chamber, said housing including a support surface having a support contour facing said opposite side of said first thin-walled support that is conformed to a configuration assumed by said first thin-walled support when deflected a maximum extent towards said chamber for continuous engagement and support therewith at said maximum deflection, and whereat said plunger means correspondingly extends beyond said predetermined range of sensing movement.

* * * * *